United States Patent [19]

McGrath

[11] 3,899,423
[45] Aug. 12, 1975

[54] SEWAGE TREATMENT SYSTEM
[75] Inventor: Thomas F. McGrath, Simi, Calif.
[73] Assignee: Lee, Meyer & Associates, Inc., Westlake Village, Calif.
[22] Filed: Jan. 13, 1972
[21] Appl. No.: 217,586

[52] U.S. Cl. .............. 210/152; 210/199; 210/202; 210/220; 210/284
[51] Int. Cl.² ...................... B01D 23/14; C02B 3/08
[58] Field of Search ............. 4/10; 210/53, 73, 152, 210/199, 206, 219, 220, 221, 521, 290, 284, 202, 256, 262, 319, 320, 260; 261/123

[56] References Cited
UNITED STATES PATENTS

| | | | |
|---|---|---|---|
| 623,439 | 5/1899 | Suman | 210/284 |
| 1,983,058 | 12/1934 | Wait | 261/123 |
| 3,047,492 | 7/1962 | Gambrel | 210/73 X |
| 3,251,471 | 5/1966 | Allen | 210/521 X |
| 3,454,608 | 7/1969 | Seip | 210/521 X |
| 3,487,937 | 1/1970 | Koulovatos | 210/206 X |
| 3,497,068 | 2/1970 | Hirsch | 210/290 X |
| 3,563,384 | 2/1971 | DeLaney et al. | 210/152 |
| 3,577,341 | 5/1971 | Keith, Jr. et al. | 210/53 |

*Primary Examiner*—Samih N. Zaharna
*Assistant Examiner*—Robert H. Spitzer

[57] ABSTRACT

A portable sewage treatment system adapted for particularly advantageous use in small watercraft, mobile equipment, and in areas where conventional sewage treatment facilities are not available is disclosed. The system includes an input macerator and pump, specially designed mixing and settling tanks and a specially designed filter tank and filter construction and includes process steps for handling the sewage through these units.

7 Claims, 4 Drawing Figures

SEWAGE TREATMENT SYSTEM

This invention relates to sewage treatment generally and more specifically to bacterial and chemical sewage treatment. More particularly, this invention relates to a process and a system for carrying out the process which accomplishes biological digestion of sewage in a small volume followed by chemical treatment to assure that all effluent is safe for discharge.

Sewage treatment conventionally involves biological degradation for the purpose of breaking down solid components of sewage and for breaking down the chemical structure of the sewage components to a form suitable for reentry into the life cycle of plants and animals. These processes are most commonly carried out in large tanks which involve aerobic and/or anaerobic digestion conditions or which rely upon extremely large surface areas for providing air for limited aerobic digestion.

Various systems and processes have been proposed for carrying out the sewage treatment and digestion in smaller volumes. It is known, for example, to add various reagents to the sewage to accelerate or aid in the digestive system and to provide apparatus for carrying out the digestion more efficiently.

The present invention constitutes an improved process and apparatus for carrying out the process where the sewage digestion and treatment can be carried out in a minimum volume at maximum efficiency. The design of the present system permits sewage digestion to be carried out in a system small enough to be included in small watercraft, pleasure boats, etc., in other environments where space is limited or where conventional sewage treatment is not feasible. The present invention should be distinguished from systems which have been proposed which involve only severe treatment of sewage with disinfectants, masking agents, etc., and in which the sewage is not in fact treated for disposal.

One of the features of the present invention is the combination of specially designed units into a compact system which can be installed aboard small to medium sized watercraft, where the invention finds unique applicability.

Another feature of the invention is the design of the individual components of the system to provide, in a minimum space and volume, maximum digestive and treatment capabilities. Among the particular features of importance are the design of the mixing tanks with vanes extending from side walls at critical angles and spacing to provide optimum mixing and digesting conditions and the design of the filter tank with which unique filter construction and flow pattern which provides a reservoir of disinfectant.

Other features of the invention will be apparent from the drawings and from the specifications which follow.

FIG. 1 of the drawing illustrates the system of the invention in schematic form.

The process of the invention comprises the steps of receiving, macerating and delivering sewage to a mixing tank of special design under specially controlled conditions which will be described later. From the mixing tank the sewage is delivered, preferably, to second mixing tank of similar design and then to a settling tank of particular design for separating the solid components from the liquid components of the sewage. The thus clarified sewage is then passed through an input filter into a filter tank. The input for first filter is so designed and constructed as to provide a surface on which biodegradable materials accummulate and continue to digest, as well as to prevent passage of particles of greater than a predetermined size.

The sewage is then disinfected in the filter tank and the thus treated effluent passes through an output or second filter which is designed to prevent passage of particles of a predetermined size. The output filter is also constructed and designed of selected materials, including activated charcoal, which adsorb large quantities of bactericide. This provides a large surface area contact of sewage with the bactericide as the treated sewage is discharged from the system.

The process also involves the injection of a coagulant into the raw sewage as it flows into the first mixing tank and into the settling tank. Oxygen, either in the form of relatively pure oxygen or in the form of air, is injected into the bottom of the mixing and settling tanks to provide continued aeration and oxygen saturation of the sewage during digestion. The bactericide is injected into the filter tank after the first filter and before the second filter.

The process of the invention also includes forcing the flow of the sewage downwardly over a series of downwardly sloping alternate vanes, which slope donwardly, at an angle, with respect to vertical, from about 60° to about 25°. The sewage is caused to flow across the vanes at a velocity of from about 0.8 feet per second to about 2.1 feet per second. The sewage is then caused to flow upwardly over the surface of similarly constructed vanes at a similar rate. These latter steps of flowing the sewage over the surfaces of the particularly disposed vanes is preferably repeated at least once.

The sewage is then caused to flow over the surfaces of downwardly sloping vanes and then upwardly over the surfaces of downwardly sloping vanes in a settling tank for separating the solid components from the liquid components, thereby clarifying the sewage for final chemical treatment.

Figure 1:
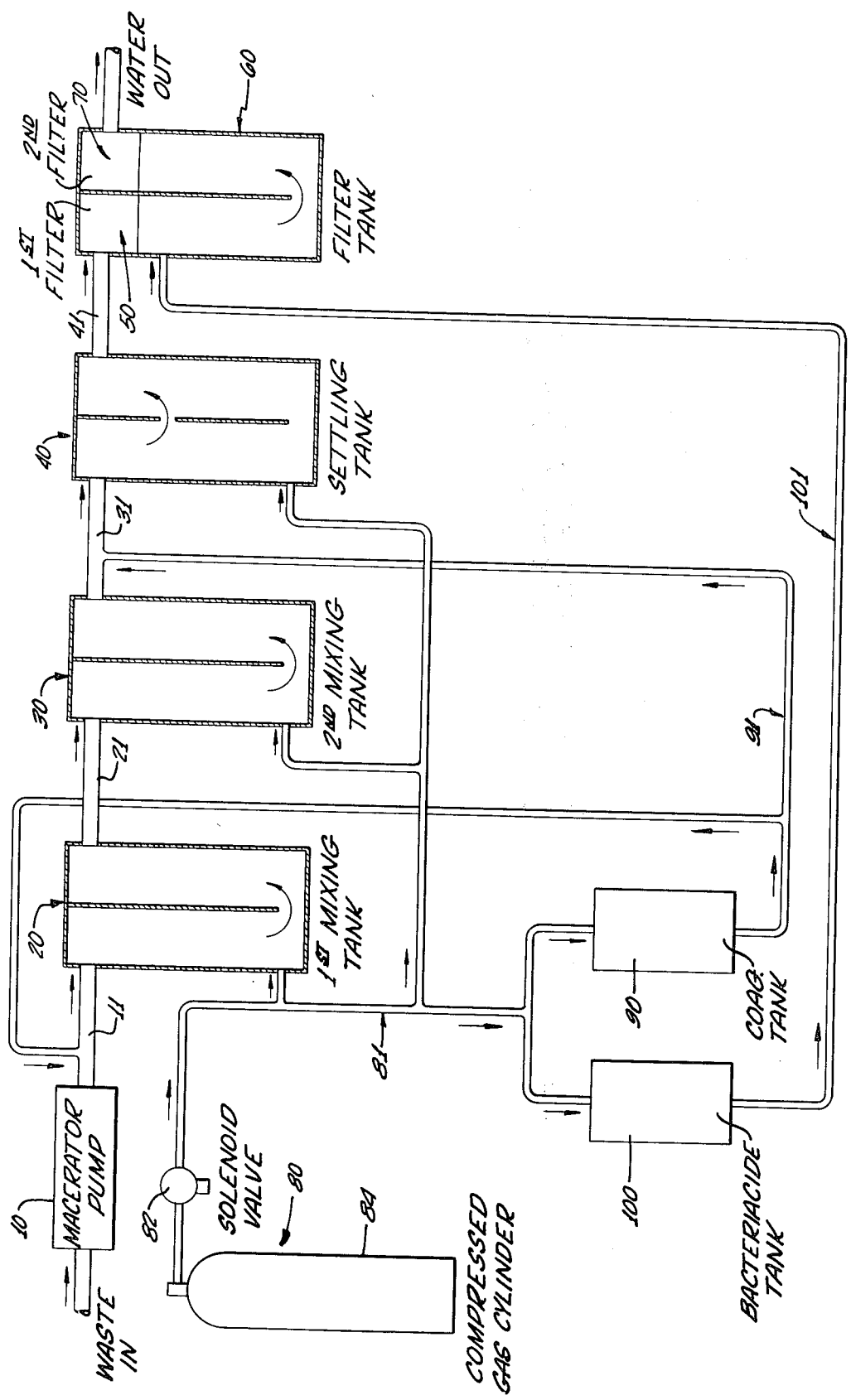

With particular reference to FIG. 1, the system of the invention includes a macerator pump 10 which receives the raw sewage and which comminates the solid material of the sewage. The macerator pump delivers the macerated or comminuted sewage to a first mixing tank 20 through which the sewage flows first downwardly and then upwardly and then to a second mixing tank 30 of similar construction and flow. The sewage, which has been largely digested in the mixing tanks, is then delivered to a settling tank 40 to permit separation of the liquid and solid components of the sewage. The thus clarified sewage is then caused to flow through a first filter 50 which is contained in a filter tank 60 and the effluent treated sewage is discharged through an output or second filter 70. To promote digestion, oxygen, either in the form of concentrated oxygen gas from a gas cyclinder or air from a cyclinder or other source indicated generally at 80 is injected into the lower portions of the first and second mixing tanks 20 and 30 and the settling tank 40. The oxygen source also provides pressurization for a source of coagulant chemical, the coagulant tank 90 from which coagulant is injected into the raw sewage as it enters the mixing tanks and the settling tank, and also provides pressurization on the bactericide tank 100 from which bactericide is injected into the filter tank.

Suitable plumbing provides the necessary interconnection. In particular, sewage flows from the macerator pump 10 through line 11 to the first mixing tank, from the first mixing tank 20 through line 21 to the second mixing tank, from the second mixing tank 30 through line 31 to the settling tank 40, from the settling tank 40 through line 41 to the input for first filter 50, through the filter tank 60, through the second or output filter 70 and is finally discharged through line 71. Oxygen is supplied from the oxygen source 80 through a tubing or plumbing system generally indicated at 81 to the first and second mixing tanks 20 and 30, the settling tank 40, to the coagulent tank 90 to the bactericide tank 100. Coagulant is delivered through a piping system generally indicated at 91 to an injection point in line 11 following the macerator pump 10 and to an injection point in line 31 following the second mixing tank 30. Bactericide is delivered through a line 101 to the filter tank 60.

The macerator pump is any one of several different types of such pumps which are commercially available. One such pump which has been found suitable for use in the present system is Model Number 17260 manufactured by ITT FLUID HANDLING DIVISION. No particular criticality is ascribed to the macerator pump except that its capacity for macerating and delivering sewage to the mixing tanks must be within the limits set forth herein. The absolute pumping capacity will depend upon the size of the mixing and settling tanks and the filter tank and these, of course, depend upon the overall capacity of the system.

The first and second mixing tanks are of unique design to provide particular advantages in the present system. The construction of these mixing tanks is exemplified by the vertical sectional view of the first mixing tank 20 shown in FIG. 2. The second mixing tank 30 being of like construction is not separately illustrated in detail.

Figure 2:
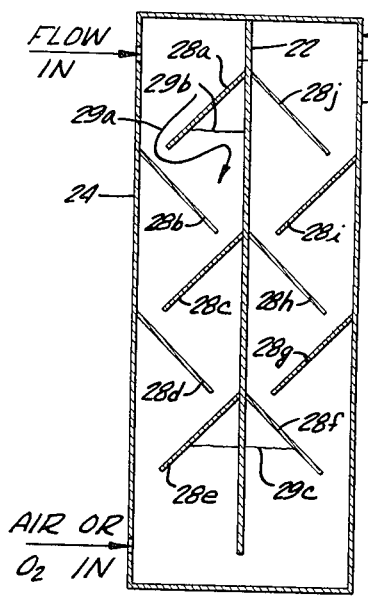
FIG. 2 is a semi-schematic vertical sectional view of the internal constructions of the mixing tank.

The flow input of the mixing tank 20 is near the top on one side is indicated in FIG. 2 and the flow output is near the top on the other side. Oxygen, which may be as a component of compressed air, is injected at a point near the bottom of the mixing tank. The mixing tank is generally square or rectangular in horizontal cross-section and includes a separator wall 22 and opposing side walls 24 and 26. Bottoms, tops and other sides are also provided so as to make the mixing tank a closed vessel. One or more of the walls, most frequently the top may be constructed to be removable for maintenance and repair. The removable wall, the top for example, may be secured in any conventional manner using, for example, gaskets for liquid seal and bolts or other frictional fasteners for securements. These details not being critical to the invention, no further discussion is deemed warranted.

The separator wall 22 and the opposing walls 24 and 26 are, in the present system, generally vertically disposed. Of course when the system is installed in a watercraft the walls will depart from the vertical by several degrees as the craft rocks but such departure is regarded as vertical within the general sense of that term as used herein. The mixing tank is divided into two chambers separated by the divider wall and defined by the opposing side walls. Within each of the chambers are a plurality of vanes 28 which slope downwardly at an angle from about 60° to about 25° from the divider wall and from the side walls. These vanes are alternately disposed, i.e., extend alternately from opposing walls, such that material falling from one vane falls onto the next lower vane. Thus material falling from vane 28a falls onto vane 28b and then onto vane 28c, etc. The material falling from vane 28e and from 28f simply falls to the bottom of the mixing chamber for continued digestion until the solid particles have been converted to liquid material. In the other chamber, the solid material falls from vane 28j to vane 28i to vane 28h, etc.

The angular sloping of the vanes as they extend away from the respective walls and the spacing of the walls and the vanes is critical. The vanes must be so constructed and the walls and vanes must be so spaced as to cause a strong turbulent flow at the point where the sewage is forced by the vanes and the walls to turn. This action of the sewage is illustrated by the arrow 29a in FIG. 2. As the sewage flows across the vane 28a at the proper velocity, it is caused to turn in the area where the sewage flow is acted upon by the vanes 28a and 28b and side wall 24. This causes great turbulence at this point and causes turbulence in the area underneath the vane 28a and a turbulent volume immediately subjacent to the liquid-gas interface 29b. In contrast, the liquid gas interface 29c is relatively stable as compared with the analogous interface where the flow is turbulent by reason of the construction and spacing of the vanes.

With vanes sloping downwardly at an angle of from about 60° to about 25°, the sewage must be caused to flow along the vanes at a velocity in the general range of from about 0.08 feet per second to about 2.1 feet per second, with some slight deviation from these minimum and maximum figures depending upon the precise construction of the walls and vanes in the mixing tanks.

As illustrated in FIG. 2, the divider wall is so constructed as to permit flow underneath or through the wall near the bottom of the mixing tank. In the overall flow through the mixing chamber, the sewage is delivered at the top of the first chamber, flows downwardly over the vanes in the velocity range of generally about 0.08 feet per second to generally about 2.1 feet per second, underneath the bottom of the divider wall 22 and upwardly over the vanes at the same velocity in the second chamber. The sewage is discharged from the mixing tank near the top.

Air or oxygen is injected near the bottom of the mixing tank such that the air flow is upwardly, air being trapped in the spaces beneath the downwardly sloping vanes to form gas liquid interfaces exemplified at the interfaces 29b and 29c in FIG. 2. Actually, the gas liquid interface will rise and fall as the oxygen is injected. Oxygen is preferred in terms of efficiency because this avoids the introduction of large quantities of inert nitrogen gas, but introduction of pure oxygen is not critical. As the gas liquid interface moves downwardly to the bottom edge of the vane, the gas escapes upwardly and forms pockets of gas under each of the vanes. For example, in start-up, oxygen would initially form a pocket of gas under the vanes 28e and 28f. From these vanes, the gas would flow upwardly to form pockets under vanes 28d, 28c, 28b and 28a respectively in the input chamber of the first mixing tank. In like manner, the oxygen will flow from beneath vane 28f to form pockets of gas under 28g, 28h, 28i and 28j, in that order. Once in operation, the gas pockets will be formed partly by the injection of oxygen and partly by the gas generated in the digestive process, and partly by rocking in watercraft. No particular means of oxygen injection into the tank, by way of nozzle, distributor, etc., is required, except that it is necessary that the gas be injected near the bottom of the mixing chamber and that the points of injection be disposed below the vanes so as to form the gas pockets as described.

In addition to directing the flow of the sewage against the surfaces of the tank wall with consequent flow turbulence in the area where the flow must turn to enter the next turbulence zone, below the respective vanes, the vane angle, at the velocity ranges set forth, serves to direct the heavy particles of the sewage to the bottom of the tank and to maintain these particles at the bottom until the bacterial digestion is complete. It also serves to direct a cloud of floc, resulting from natural processes and from the injection of the floculating material into the sewage and the solids, which accumulate on the surface of the vane to the bottom whenever the flow occurs or whenever the tank is rocked. The vanes also serve to form constantly regenerating pockets in which oxygen is trapped. This provides continued saturation and resaturation of the sewage with oxygen to accelerate aerobic digestion thereof.

It has, through experience and testing, been found that the vane angle requirements in the mixing chambers depend on the size of the chamber and the fluid velocity with which the sewage is injected. The angle can vary from as great as 60° to as low as 25°, with respect to the vertical, when the flow velocity ranges are from about 0.08 feet per second, perhaps slightly lower, to about 2.1 feet per second, or perhaps slightly higher. The determination of the relationship of the size of the chamber to the vane angle is empirical, and must be based upon testing. For example, with a rocking rate of once per minute and a heel angle of 5°, a 60° angle appears to be optimum to maximize the spray of sewage into the gas void for a six inch by six inch chamber. For the same rate and heel angle, a 45° angle appears to be optimum for a two foot by two foot chamber.

The gas pockets formed by the vanes also serve several purposes. The pockets serve to accummulate the gas bubbling into the system, as discussed before, or spilling over from one pocket to a higher pocket when the system is heeled, as in the rocking in a watercraft. These pockets serve as oxygenating chambers through which the sewage is sprayed when the pump in the system is actuated to cause flow within the velocities indicated, or when the system is rocked to provide sufficient momentum to the sewage to cause spraying. The gas-liquid interface also serves as a bacteria growth area. Actually, the bacteria grow in a dense colony on the wall at this interface and, consequently, are not flushed from the system with the sewage. The bacteria necessary for the aerobic digestion of sewage are, therefore, constantly regenerated through the bacteria colonies at the gas-liquid interfaces in the pockets underneath the vanes. The gas pockets also serve as shock snubbing pockets, hence there is no hydrostatic shock (water-hammer) in the system when the pump is started or stopped.

The optimum vane angle is a function of flow velocity and optimum vane angle within the ranges given will be inversely proportional to the flow velocity, i.e., the higher the flow velocity, the lower the required vane angle. In any event, the spacing of the vane edges from adjacent the vane or the bottom of the tank must be such as to maintain a flow velocity in the genral range indicated. With these criteria available, the capacity of the input pump, the vane angle and spacing and wall spacing can be calculated based upon the size of the chambers, the size of the vanes which can be placed in the chambers, and conventional fluid flow criteria. Too high a flow velocity results in undesirable turbulence and in foam formation and inadequate digestion. Too low a flow velocity does not provide sufficient aeration of the sewage with resultant incomplete aerobic digestion or undesirable anerobic digestion.

To date no theoretical basis has been postulated which would permit arrival at the critical values and the values have been determined empirically through experimentation with mixing tanks of various sizes, shapes, configurations, bend angles, flow velocities, etc.

Figure 3:
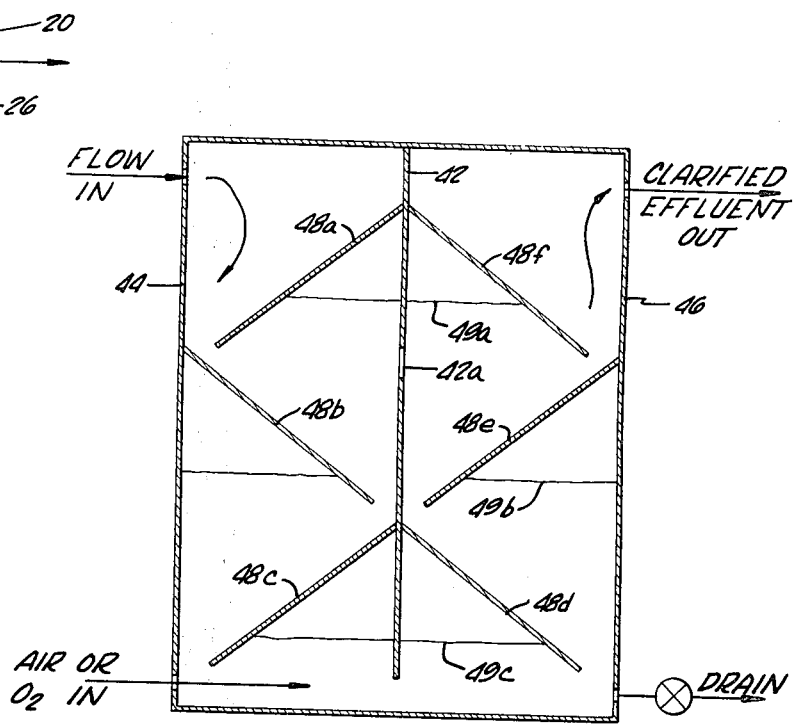
FIG. 3 is a semi-schematic vertical sectional view of the internal construction of the settling tank.

The settling chamber 40 shown in FIG. 3 is preferably larger in horizontal cross-sectional area than the mixing chambers to permit less turbulent flow there through. The settling chamber also incorporates vaned chambers. The slope of this vane is only critical to provide mixing action with the oxygen during rocking of the system, so that precipitated sludge is maintained in an aerobic condition. The chamber includes a separator wall 42 with opposed walls of 44 and 46 from which vanes 48 extend sloping downwardly, much in the manner in which the mixing tank is constructed. The purpose of the settling tank, however, is to clarify the sewage effluent by separating the liquid components from the solid components. Thus, the vanes are so constructed and spaced and the walls are so spaced as to provide relatively larger air pockets having large gas-liquid interfaces shown at 49a, 49b and 49c, for example.

In the settling tank, the separator wall 42 is provided with a passage 42a which permits liquid flow from the input chamber to the output chamber of the settling tank through the passage. Since the sewage flow is relatively slow in the area of both sides of the divider wall 42, the preliminary solid-liquid separation along vanes 48a and 48b and the subsequent solid-liquid separation along vanes 48e and 48f are sufficient to clarify a large portion of the liquid sewage components. The solid components and the heavily solid liquid components flow downwardly along the vanes 48b and 48c, under the divider wall 42 and upwardly along the vanes 48d and 48e providing additional separation of solids from liquids. The solids can be periodically removed from the settling tank by any conventional means, such as through a drain valve, through a clean-out cap, or other access port.

The flow of the liquid through the settling tank cannot be continuous. The volume of the flow and the time interval between the flow must be such that there is at least 30 minutes of non-flow period to allow the solids to settle to the bottom. Otherwise, solids will be carried over into the filter. It is also critical that additional coagulent be added to the sewage at the entrance of the settling tank. This secondary addition of the coagulent materially improves the efficiency.

As previously indicated, the settling tank is preferably larger in horizontal sectional area than the mixing tanks and, in addition, it is preferably in the larger volume. Indeed, the capacity of the overall system can effectively be increased by increasing the volume of the settling tank, without the necessity of increasing the volume of the mixing tanks.

Figure 4:
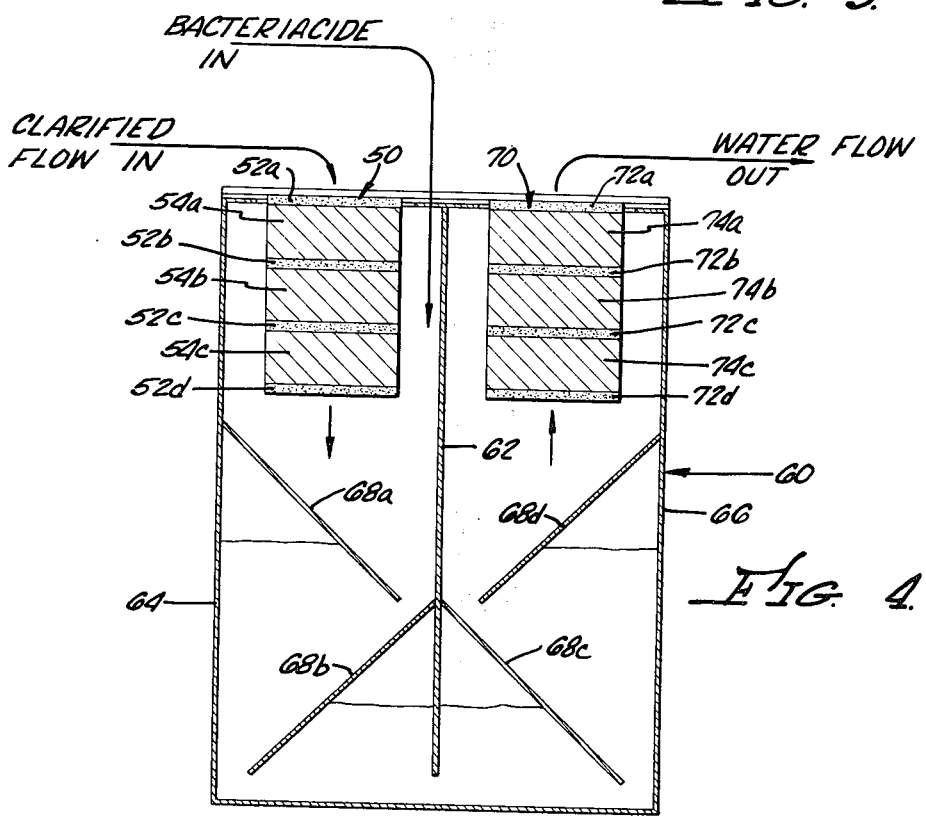
FIG. 4 is a semi-schematic vertical sectional view of the internal construction of the filter tank.

The clarified sewage flows through the input for first filter 50 into the filter tank 60. As illustrated in FIG. 4, the filter 50 comprises a plurality of porous layers 52 which may be composed of open cell polyurethane, felt, fabrics, or foraminous materials generally. These layers are shown at 52a, 52b, 52c, 52d, etc. Alternately contained between these porous layers are layers 54 of activated charcoal. The function of the foraminous layers is to insure that the charcoal does not channel. The foraminous layers and the charcoals may be contained in a walled cyclinder or box of any desired construction or configuration. The input filter 50 is a coarse filter which strains out 20 micron and larger size solids. The bacterial digestion continues in this filter for those particles which are biodegradable. The activated charcoal provides some decolorization and that provides a surface on which the biodegradable materials can accummulate and continue to digest with a high dissolved oxygen content of the liquid maintaining aerobic conditions. This filter also operates as a safety for the system. If the system is overused, it prevents solids from being carried out of the system.

The filter tank 60 is constructed similarly to the settling tank in that it includes a divider wall 62, opposed side walls 64 and 66 and vanes 68. The top of the filter tank is removable and carries the filters 50 and 70 therewith. The filter tank may be secured and removed in any conventional fashion, such as previously discussed, i.e., using gaskets, bolts or frictional fasteners. This permits the filters to be removed for maintenance and replacement periodically.

A bactericide is injected into the filter tank with each operation of the sewage system. This places a predetermined amount of bactericide in the filter tanks such that as the sewage flows outwardly from the filter 50 it comes into immediate contact with the bactericide in the liquid contained in the filter tank. The killing action of the bactericide continues throughout transit of the sewage around the baffles and under the divider wall in the filter tank.

The output or second filter also includes alternate layers of foraminous material 72, as previously described, and of activated charcoal 74. The output filter removes much of the mass of killed bacteria. The output filter also accummulates a bactericide on the surface of the particles therein. This permits intimate contact of the effluent sewage over a large surface area which has adsorbed thereon the bactericide. In addition to increasing the efficiency of the bactericidal effect, the adsorbed bactericide constitutes a large reservoir of bactericide which will remain effective in the event of a short term malfunction or failure of the system to provide sufficient bactericide into the liquid sewage.

The filters between 50 and 70 are designed to be replaced as a pair and are integral with the lid of the filter tank. This latter feature is not essential to the design but it does increase the probability that the filters will be replaced, rather than discarded, when the filters become clogged.

In operation, the sewage is introduced into the system by operating the macerator pump. In the preferred embodiment the solenoid valve 82 is operated automatically upon operation of the macerator pump permitting oxygen to flow from the compressed gas cyclinder 84 into the first and second mixing tanks and the settling tanks.

The oxygen pressure is also applied through line 81 to the coagulant tank 90 and the bactericide tank 100. This causes the injection of coagulant into line 11 before the first mixing tank and into line 31 before the settling tank. Bactericide is injected into the filter tank. The amount of coagulant and the amount of bactericide which is injected may be controlled using any of the conventional fluid control mechanisms which are available. Metering valves, such as needle valves, may be used such that the rate of flow of coagulent and bactericide during the period of oxygen application to the coagulent and bactericide tanks is limited and can be varied and will. The precise mechanism for controlling the amount of coagulent and bactericide which is injected is not a critical feature of this invention, and any mechanism, including simply the choice of tubing or pipe size may be used. Obviously, fluid actuated injection pumps, etc., could also be used if desired.

Thus, simply by operating the macerator pump, which may also be operated simultaneously with the flushing of a toilet, the emptying of a basin or sink, etc., places the system into operation and provides for injection of all the materials necessary to provide the desired sewage treatment.

Alum, ferric chloride and other typical aluminum and iron coagulent materials have proved effective in the present system. These materials function best when injected in a lime water solution to control the Ph of the sewage under treatment. A concentration which provides the best operation in sewage which consists mainly of human waste and domestic garbage is about 200 milligrams per liter. Water soluble organic polymers have been tested to determine if coagulation is improved, but no significant improvement in flocculation or coagulation has been observed.

The bactericides which have been tested in the system include gaseous chlorine, sodium hyprochlorite, calcium hyprochlorite and quatenary ammonium chlorides. The most effective of these, in reducing and killing the bacteria in the system, the most significant of the bacteria being streptococci, is a mixture of sodium hyprochlorite and a quatenary ammonium chloride, n-alkyl dimethyl benzyl ammonium chloride, which is injected at a level of about 50 milligrams per liter.

The operation of the system is controlled by a single switch, operated at the point at which the waste is to be fed into the system. This switch simultaneously operates the macerator pump, which pumps the raw sewage into the first mixing tank, and a solenoid valve of which opens a path for pressurized oxygen or air to flow into the mixing and settling tanks and to pressurize the bactericide and coagulent feed system to inject these materials at the appropriate points. The flow continues as long as the material is being discharged into the system, thus automatically regulates the ratio of the chemicals injected into the system to the volume input to the system. When the pump is stopped, by releasing the switch, the flow of chemicals, i.e., coagulent and bactericides, is also stopped.

The process of this system greatly reduces the biochemical oxygen demand (BOD) of the resulting effluent. The system and the process also reduces the suspended solids content of the effluent and reduces the bacterial content of the effluent so that the resulting effluent more mroe readily adsorbed or utilized in ground or flowing water, or in soil. The resulting effluent also posses less problem or hazard to the life of the stream, ground and less problem to recycle through the normal biological processes.

The system effluent has no preceptible bacteria, the initial biochemical oxygen demand has been reduced by 85% or greater reduction, and the original solids content of the effluent has been reduced by at least 90%. In the present version, this system is capable of handling body, wash water and gallery wastes for a group of four people. A typical system weight, when full, is about 200 lbs and takes up a space of little more than three cubic feet.

The system will operate in salt water, brackish water or in fresh water. Periodically, on an average of about 6 months, the settling tank 40 must be flushed into a 5 gallon can and disposed of on shore. The system operates in an odorless manner with a clear and completely unobjectionable effluent. Each time the system is operated a volume of effluent equivalent to the volume of input is discharged.

The preceding discussion has considered a specific embodiment of the process and of the system but it will be understood that the invention is not limited to these specific embodiments but includes systems operating within the scope of the following claims.

What is claimed is:

1. A portable, small volume sewage processing system adapted for use in watercraft, mobile equipment and where sewage treatment facilities are not available comprising, in combination;

means for receiving, macerating and delivering sewage to a mixing tank;

at least one mixing tank disposed and connected to receive macerated sewage which includes opposing generally vertical walls, said walls having a plurality of downwardly sloping vanes extending therefrom at a predetermined angle with respect to the vertical in alternating disposition such that material falling from one vane impinges upon an alternate lower vane extending from an opposing wall;

at least one settling tank disposed and connected to receive sewage from the mixing tank for permitting the separation of solid sewage components from liquid sewage components, the settling tank including opposed upright walls having a plurality of downwardly sloping vanes extending therefrom at a predetermined angle with respect to vertical in alternation disposition such that material falling from one vane impinges upon a lower alternate vane extending from the opposing wall, with solid material falling from the bottom of such vanes and being collected in the bottom of the settling tank for periodic removal;

a filter tank connected for receiving clarified sewage from the settling tank the filter tank including an input filter through which the clarified sewage flows into the filter tank and an output filter through which clarified and disinfected sewage flows from the filter tank;

means for injecting coagulent into the sewage in the mixing tank and in the settling tank;

means for injecting oxygen into the mixing and settling tanks at a point below the alternating vanes therein; and means for injecting bactericide into the filter tank;

the output filter in said tank being so composed and constructed as to absorb bactericide thus providing a large surface contact area between the bactericide and the sewage and a reservoir of bactericide in the filter tank;

the vanes in the mixing tank being so spaced and angularly disposed as to cause turbulent flow at the point of which the sewage flow turns to direct heavy solid particles to the bottom of the tank for bacterial digestion, to direct a cloud of flocculated sewage to the bottom of the tank, and to form pockets of oxygen beneath said vanes to provide constant contact between oxygen and the sewage under treatment.

2. The sewage processing system as set forth in claim 1 wherein the vanes in the mixing tank extend downwardly from the walls at an angle with respect to vertical walls from about 60° to about 25° and wherein the means for delivering the sewage to the mixing tank injects the sewage into the tank at a rate to cause the sewage to flow across the vanes at a velocity of from about 0.08 feet per second to about 2.1 feet per second.

3. The sewage processing system as set forth in claim 2 wherein the input filter is a coarse filter for preventing passage of particles greater than about 20 microns in size and is so constructed as to provide a surface on which biodegradable materials accumulate and continue to digest.

4. The sewage process system as set forth in claim 3 wherein;

the input filter is constructed of alternate layers of activated charcoal and foraminous material; and the second filter is constructed of alternate layers of activated charcoal and foraminous material.

5. A portable, small volume sewage processing system adapted for use in watercraft, mobile equipment and where sewage treatment facilities are not available comprising, in combination:

means for receiving, macerating and delivering sewage to a mixing tank at a predetermined rate;

a plurality of mixing tanks connected in series for receiving macerated sewage at a predetermined rate, said mixing tanks having two chambers separated by generally vertical divider wall and defined by opposing generally vertical side walls with a plurality of at least four vanes sloping downwardly at an angle from about 60° to about 25° from the divider wall and from the side walls in alternating disposition such that material falling from the vane impinges onto the next lower vane which extends from an opposing wall, the walls being so spaced and the vanes being so constructed and spaced as to result in strongly turbulent flow in the area where the sewage is forced by the vanes and the walls to turn, the predetermined rate being such as to cause the sewage to flow over the vanes at a velocity of from about 0.08 feet per second to about 2.1 feet per second, the dividing wall being so constructed as to permit flow from the lower portion of of the first chamber to the lower portion of the second chamber, the sewage being delivered into the top portion of the first chamber, flowing downwardly over the vanes at said velocity and the first chamber, flowing to the second chamber and upwardly over the vanes at the velocity in the second chamber and flowing from the upper portion of the second chamber;

a settling tank connected to receive sewage from the last mixing tank, to separate solid sewage components from liquid sewage components;

a filter tank connected for receiving clarified sewage from the settling tank, the filter tank including an input filter through which the clarified sewage flows into the filter tank and an output filter through which clarified and disinfected sewage flows from the filter tank;

means for injecting coagulent into the sewage in the mixing tank and in the settling tank;

means for injecting oxygen into the mixing and settling tanks at a point below the alternating vanes therein; and means for injecting bactericide into the filter tank;

the output filter in said tank being so composed and constructed as to absorb bactericide thus providing a large surface contact area between the bactericide and the sewage and a reservoir of bactericide in the filter tank;

the vanes in the mixing tank being so spaced and angularly disposed as to cause turbulent flow at the point at which the sewage flow turns, to direct heavy solid particles to the bottom of the tank for bacterial digestion, to direct a cloud of floculated sewage to the bottom of the tank, and to form pockets of oxygen beneath said vanes to provide constant contact between oxygen and the sewage under treatment.

6. The sewage processing system as set forth in claim 5 wherein the input filter is a coarse filter for preventing passage of particles greater than about 20 microns in size and is so constructed as to provide a surface on which biodegradable materials accumulate and continue to digest.

7. The sewage process system as set forth in claim 6 wherein;

the input filter and output filter are constructed of alternate layers of activated charcoal and foraminous material and wherein;

the filter tank includes a removable top and the input and output filters are so constructed and attached as to be removable with the top for cleaning and replacement.

* * * * *